US012586817B2

(12) United States Patent
Kyu et al.

(10) Patent No.: US 12,586,817 B2
(45) Date of Patent: Mar. 24, 2026

(54) POLYSULFIDE-POLYOXIDE ELECTROLYTE MEMBRANE FOR ENERGY STORAGE DEVICE

(71) Applicants: The University of Akron, Akron, OH (US); NISSAN NORTH AMERICA, INC., Franklin, TN (US)

(72) Inventors: Thein Kyu, Akron, OH (US); Hyunsang Lee, Lyndhurst, OH (US); Jisoo Jeong, Stow, OH (US); Javier Parrondo, Novi, MI (US); Dianne Atienza Hay, Hartland, MI (US); Somayeh Zamani, Novi, MI (US)

(73) Assignees: THE UNIVERSITY OF AKRON, Akron, OH (US); NISSAN NORTH AMERICA, INC., Franklin, TN (US)

( * ) Notice: Subject to any disclaimer, the term of this patent is extended or adjusted under 35 U.S.C. 154(b) by 687 days.

(21) Appl. No.: 17/937,030

(22) Filed: Sep. 30, 2022

(65) Prior Publication Data

US 2024/0128503 A1 Apr. 18, 2024

(51) Int. Cl.

| | |
|---|---|
| ***H01M 10/0565*** | (2010.01) |
| ***H01M 4/04*** | (2006.01) |
| ***H01M 4/38*** | (2006.01) |
| ***H01M 4/485*** | (2010.01) |
| ***H01M 10/0525*** | (2010.01) |
| ***H01M 10/058*** | (2010.01) |

(52) U.S. Cl.

CPC ..... *H01M 10/0565* (2013.01); *H01M 4/0447* (2013.01); *H01M 4/382* (2013.01); *H01M 4/485* (2013.01); *H01M 10/0525* (2013.01); *H01M 10/058* (2013.01); *H01M 2300/0082* (2013.01)

(58) Field of Classification Search

CPC ......... H01M 10/0565; H01M 10/0525; H01M 10/058; H01M 4/0447; H01M 4/382; H01M 4/485; H01M 2300/0082

See application file for complete search history.

(56) References Cited

U.S. PATENT DOCUMENTS

| | | | |
|---|---|---|---|
| 2012/0037034 | A1 | 2/2012 | Barancyk et al. |
| 2022/0131179 | A1 | 4/2022 | Kyu et al. |

OTHER PUBLICATIONS

Onozuka et al., Ion conductive polymer electrolyte membranes based on star-branched poly(ethylene-glycol tri-acrylate) and polysulfide macromonomers, Solid State Ionics 346 (2020) 115182, Available online Dec. 28, 2019.

*Primary Examiner* — James Lee

(74) *Attorney, Agent, or Firm* — RENNER KENNER GREIVE BOBAK TAYLOR & WEBER

(57) ABSTRACT

An energy storage device is provided that includes a first electrode, a second electrode, and a polymer electrolyte membrane disposed between the first electrode and the second electrode. The polymer electrolyte membrane includes a copolymer network including a polyoxide and a polysulfide. The polymer electrolyte membrane is prelithiated by deep discharging of the battery of in a voltage range of −0.5 V to 5.0 V such that the polymer electrolyte membrane after deep discharging includes additional lithium ions stored therein as compared with prior to deep discharging.

17 Claims, 1 Drawing Sheet

POLYSULFIDE-POLYOXIDE ELECTROLYTE MEMBRANE FOR ENERGY STORAGE DEVICE

BACKGROUND

Field of the Invention

The present invention generally relates to a polysulfide-polyoxide electrolyte membrane for an energy storage device, an energy storage device including the polysulfide-polyoxide electrolyte membrane, and a method of forming a battery having a prelithiated polysulfide-polyoxide electrolyte membrane. The energy storage device includes a first electrode, a second electrode, and a polymer electrolyte membrane disposed between the first electrode and the second electrode. The polymer electrolyte membrane includes a copolymer network including a polyoxide and a polysulfide. The polymer electrolyte membrane is prelithiated by deep discharging of the battery of in a voltage range of −0.5 V to 5.0 V such that the polymer electrolyte membrane after the deep discharging includes additional lithium ions stored therein as compared with prior to the deep discharging.

Background Information

Lithium-based batteries are desirable because they have a high energy density and, thus, can generate a large amount of power with a relatively thin electrode structure, thus permitting a reduction in the size of the battery as compared with other conventional batteries including anodes made of carbon or silicon. Lithium-based batteries use lithium metal anodes and/or cathodes formed of complex oxides such as lithium nickel manganese cobalt oxide ($LiNiMnCoO_2$, also commonly referred to as "NMC"). However, there are several drawbacks with lithium metal anodes. For example, the performance of lithium metal anodes is limited by current density as such anodes are prone to excessive dendritic growth and accumulation of dead lithium resulting in severe volume expansion of the anode.

In order to improve the safety and energy storage capacity of lithium-based batteries using solid electrolytes, solid-state batteries have been developed that use a solid or polymer electrolyte to conduct lithium ions between the anode and cathode. Solid-state batteries allow for a much smaller battery size due to their improved energy density. Solid state lithium-based batteries also have an improved safety performance, an enhanced life cycle and higher charge/discharge rates as compared with conventional lithium-ion batteries using a liquid electrolyte, which can lead to undesirable dendrite formation and short-circuiting.

It has been believed that the specific battery capacity of a solid-state lithium-ion battery is limited primarily by the type of cathode material used in the battery. Conventional lithium cathode materials, such as NMC, $LiCoO_2$, $LiNiO_2$, other lithium transition metal oxides, and $LiFePO_4$, have high cell potentials but a low specific battery capacity of only approximately 160-170 mAh/g. Other cathode materials, such as tin-containing materials, have a much higher specific battery capacity but a very low cell potential.

Therefore, it is desirable to provide a solid-state lithium-ion battery that simultaneously has a high cell potential and a high specific battery capacity to further improve the energy density of the battery. Conventional solid-state batteries have an energy density of approximately 150 Wh/kg. Therefore, further improvement is needed to increase the energy density of solid-state lithium-ion batteries.

SUMMARY

It has been discovered that the energy density of the solid-state lithium-ion battery can be significantly increased from the conventional value of 150 Wh/kg to approximately 400-500 Wh/kg by providing a polyoxide-polysulfide polymer electrolyte membrane that is prelithiated to store a large amount of excess lithium ions. The polymer electrolyte membrane before prelithiation has a high ionic conductivity, approaching that of superconductors, of greater than 10-3 S/cm (approximately 1.2-1.5 mS/cm) at room temperature and approximately 10'S/cm (approximately 8.8-10 mS/cm) at 90-100° C.

The prelithiated polymer electrolyte membrane exhibits pseudo-capacitive and/or electric double layer capacitor ("EDLC") behavior that further affords extra storage capacity of lithium ions through coordination bonding of dissociated lithium cations with ether oxygen or nucleophilic amines within the polymer electrolyte network as well as at the interface of the polymer electrolyte membrane and the cathode. Upon lithiation, there are excess lithium ions available to facilitate ion transport through the coordinated bonded lithium ions with ether oxygen or amine complexes, hence both ion conduction and storage capacity can be enhanced reaching a comparable level to an EDLC. In contrast, if the same prelithiation process were performed by deep discharging a lithium-ion battery having a liquid electrolyte, the liquid electrolyte would boil and leak causing the battery explosion and ultimately catching fire.

The prelithiated polymer electrolyte membrane is an electrochemically stable interface layer having a unique ability for extra storage of lithium ions above and beyond that of the cathode due to the co-network chain architecture of the polymer electrolyte membrane.

Therefore, it is desirable to provide a lithium-ion battery, such as a solid-state lithium-ion battery, that includes such a prelithiated polymer electrolyte membrane in which a copolymer of a polyoxide and a polysulfide is used to store excess lithium ions and thereby improve the energy density of the battery.

In view of the state of the known technology, one aspect of the present disclosure is to provide a method of forming a battery having a prelithiated polymer electrolyte membrane. The method includes forming a polymer electrolyte membrane, forming a battery including an anode, a cathode and the polymer electrolyte membrane disposed between the anode and the cathode, and performing deep discharging of the battery in a voltage range of −0.5 V to 5.0 V to prelithiate the polymer electrolyte membrane. The polymer electrolyte membrane includes a copolymer network including a polyoxide and a polysulfide, and at least one of the anode and the cathode comprises a material that includes lithium.

Another aspect of the present disclosure is to provide an energy storage device. The energy storage device includes a first electrode, a second electrode, and a polymer electrolyte membrane disposed between the first electrode and the second electrode. The polymer electrolyte membrane includes a copolymer network including a polyoxide, which may be referred to as a polyoxide-containing compound, and a polysulfide, which may be referred to as a polysulfide-containing compound. The polymer electrolyte membrane is prelithiated by deep discharging of the battery of in a voltage range of −0.5 V to 5.0 V such that the polymer electrolyte membrane after the deep discharging includes additional lithium ions stored therein as compared with prior to the deep discharging.

Because the polymer electrolyte membrane includes a co-network of a polyoxide and a polysulfide, the polymer electrolyte membrane has a unique ability for extra storage of lithium ions. Therefore, by prelithiating the polymer electrolyte membrane through deep discharge, excess lithium ions may be stripped from the anode and stored in the polymer matrix of the polymer electrolyte membrane as well as the interface with the electrode. Thus, the energy density of the energy storage device may be significantly improved such that the energy storage device functions as a supercapacitive battery or a supercapacitor.

A further aspect of the present disclosure is to provide a polymer electrolyte membrane comprising a copolymer network, a plasticizer, and a lithium salt. The copolymer network includes a crosslinked network of a polyoxide and a polysulfide. The polyoxide has the following formula:

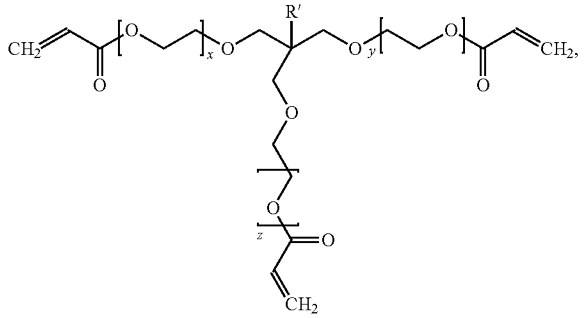

where R' is selected from the group consisting of: $CH_3$—; $CH_3$—$CH_2$—; $CH_3$—$CH_2$—$CH_2$—; $CH_3$—$CH_2$—$CH_2$—$CH_2$—; $CH_3$—$CH_2$—$CH_2$—$CH_2$—$CH_2$—; $CH_3$—$CH_2$—$CH_2$—$CH_2$—$CH_2$—$CH_2$—; $CH_3$—$CH_2$—$CH_2$—$CH_2$—$CH_2$—$CH_2$—$CH_2$—$CH_2$—; an isopropyl group; an isobutyl group; an isopentyl group; a sec-butyl group; a tert-butyl group; a tert-pentyl group; a tert-hexyl group; a phenyl group; a benzyl group; and an acrylic acid 2-(2-acryloyloxy-ethoxymethyl)-2-acryloyloxymethyl-butyl ester group, and x, y and z are integer numbers, the sum of which (x+y+z) ranges from 15 to 20, covering various combinations of ethoxylated trimethylolpropane tri-acrylate ("EO-TMPTA") (x+y+z=15) and polyethylene glycol triacrylate ("PEG3A") (x+y+z=20). The polysulfide has the following formula:

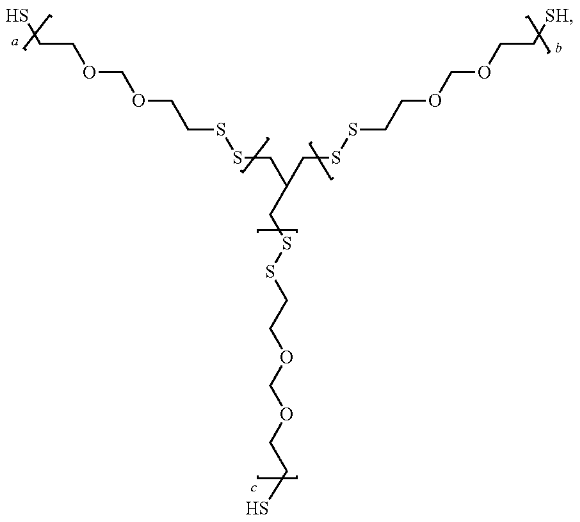

where a, b and c are integer numbers, the sum of which (a+b+c) ranges from 3 to 28, preferably 5 to 26, covering various combinations of Thioplast® G1 (a+b+c=26 to 28) and Thioplast® G4 (a+b+c<5) since both grades work well together and also individually.

By forming the polymer electrolyte membrane using the polyoxide and the polysulfide, the polymer electrolyte membrane has a unique storage capacity for excess lithium ions. Therefore, it has been discovered that this particular polymer electrolyte membrane can be prelithiated by deep discharge to strip a large amount of lithium ions from the anode and store those lithium ions in the polymer electrolyte membrane. This prelithiation results in a battery having an improved energy density as compared with conventional solid-state batteries.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
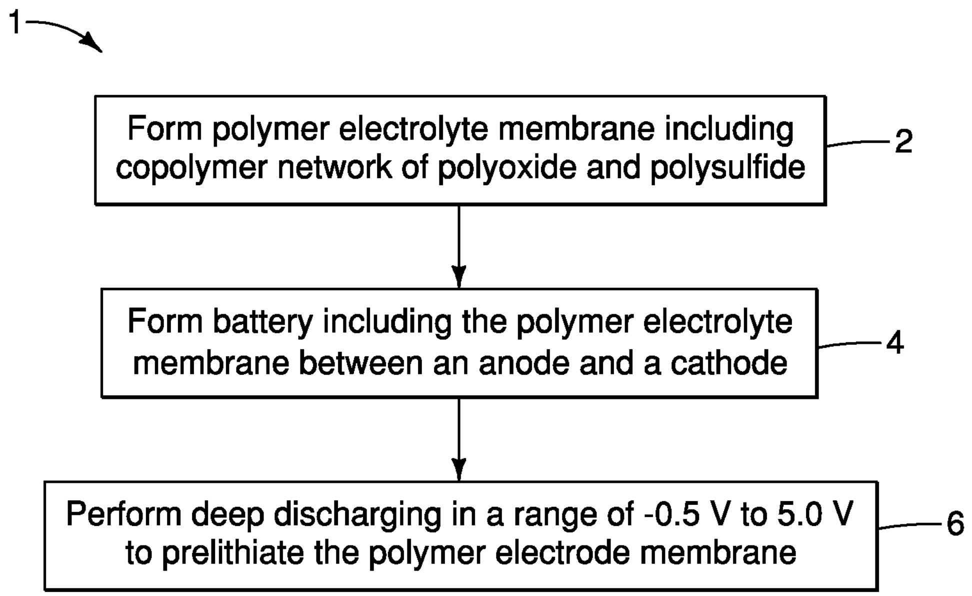
FIG. 1 is an illustrated flow chart showing a process of forming a battery having a prelithiated polymer electrolyte membrane according to a first embodiment.

Referring initially to FIG. 1, a process 1 is illustrated for forming a battery having a prelithiated polymer electrolyte membrane in accordance with a first embodiment. The battery is a solid-state lithium-ion battery that includes a polymer electrolyte membrane. The solid-state lithium-ion battery may be incorporated in a vehicle, a mobile device, a laptop computer or other suitable personal electronic devices.

In Step 2, a polymer electrolyte membrane is formed. The polymer electrolyte membrane includes a copolymer network of a polyoxide and a polysulfide. The polyoxide can be any suitable polyoxide having the following formula:

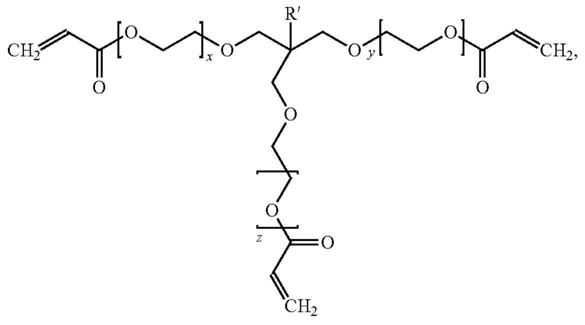

where R' is selected from the group consisting of: $CH_3$—; $CH_3$—$CH_2$—; $CH_3$—$CH_2$—$CH_2$—; $CH_3$—$CH_2$—$CH_2$—$CH_2$—; $CH_3$—$CH_2$—$CH_2$—$CH_2$—$CH_2$—; $CH_3$—$CH_2$—$CH_2$—$CH_2$—$CH_2$—$CH_2$—; $CH_3$—$CH_2$—$CH_2$—$CH_2$—$CH_2$—$CH_2$—$CH_2$—$CH_2$—; an isopropyl group; an isobutyl group; an isopentyl group; a sec-butyl group; a tert-butyl group; a tert-pentyl group; a tert-hexyl group; a phenyl group; a benzyl group; and an acrylic acid 2-(2-acryloyloxy-ethoxymethyl)-2-acryloyloxymethyl-butyl ester group, and x, y and z are integer numbers, the sum of which (x+y+z) ranges from 15 to 20, covering various combinations of EO-TMPTA (x+y+z=15) and PEG3A (x+y+z=20). The polyoxide is preferably formed from an EO-TMPTA prepolymer in which (x+y+z=15).

The polysulfide can be any suitable thiol-terminated polysulfide. For example, the polysulfide may be a star-branched polysulfide having the following formula:

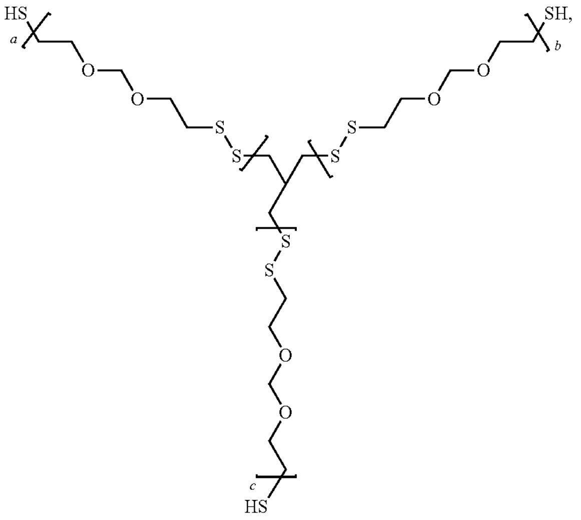

where a, b and c are integer numbers, the sum of which (a+b+c) ranges from 3 to 28, preferably 5 to 26. The flexibility of the polymer electrolyte membrane can be adjusted by changing the length of the polymer chain. For example, the longer the chain, the more the flexibility of the polymer electrolyte membrane will be increased. For example, the polysulfide can be a Thioplast® G prepolymer, preferably Thioplast® G1 or Thioplast® G4.

Alternatively, the polysulfide may be selected from the group consisting of: pentaerythritol tetrakis(3-mercaptopropionate), 2 2'-(ethylenedioxy) diethanethiol, hexa(ethylene glycol) dithiol, trimethylolpropane tris(3-mercaptopropionate), tris 2-(3-mercaptopropionyloxy)ethyl isocyanurate, and mixtures thereof.

The polymer electrolyte membrane is formed by mixing the first monomer for the polyoxide with a monomer for forming the polysulfide, along with a polymerization initiator. The first monomer may be mixed with the monomer for forming the polysulfide in any suitable ratio. For example, the first monomer may be mixed with the monomer for forming the polysulfide in a ratio of 3:7 to 7:3.

Furthermore, the polymerization initiator may be mixed with the monomer mixture in an amount of 3% by weight relative to a total amount of the monomer mixture and the polymerization initiator. The monomer mixture and the polymerization initiator may then be stirred at a temperature of approximately 40-60° C., preferably 55° C., for approximately 1-3 hours, preferably 2 hours.

The monomer mixture and the polymerization initiator may then be mixed with a plasticizer and a lithium salt to form a polymer film solution. The plasticizer may be any suitable plasticizer. For example, the plasticizer can be succinonitrile ("SCN"), vinylene carbonate ("VC"), vinyl imidazolium ("VIM"), tetramethyl succinonitrile, or a mixture thereof. The plasticizer is preferably SCN. Alternatively, the plasticizer can be dimethyl phthalate, diethyl phthalate, diisobutyl phthalate, di-n-butyl phthalate, butyl benzyl phthalate, bis(2-ethylhexyl) phthalate, diisononyl phthalate, bis(2-propylheptyl) phthalate, diisodecyl phthalate, diisoundecyl phthalate, ditridecyl phthalate, bis(2-ethylhexyl)terephthalate, a trimellitate such as tri-(2-ethylhexyl)trimellitate, tri-(isononyl)trimellitate, tri-(isodecyl) trimellitate, or tri-(isotridecyl)trimellitate, tricresyl phosphate, 2-ethylhexyldiphenyl phosphate, tri-2-ethylhexyl phosphate, triethylene glycol di-2ethylhexanoate, or a mixture thereof.

The lithium salt may be any suitable lithium salt. For example, the lithium salt can be lithium bis(trifluoromethanesulfonyl)imide ("LiTFSI"), lithium bis(fluorosulfonyl) imide ("LiFSI"), lithium fluorosulfonyl-(trifluoromethane sulfonyl) imide ("LiFTFSI"), lithium hexafluorophosphate ("$LiPF_6$"), lithium tetrafluoroborate ("$LiBF_4$"), lithium hexafluoroarsenate ("$LiAsF_6$"), lithium perchlorate ("$LiClO_4^-$"), lithium trifluoromethanesulfonate ("$LiCF_3SO_3$"), triflate ("Tf"), or a mixture thereof. The lithium salt is preferably LiTFSI.

The plasticizer and lithium salt may be mixed with the monomer mixture and the polymerization initiator in any suitable amount to form the polymer film solution. For example, the monomer mixture may be mixed in an amount of 15-30%, preferably 30%, by weight relative to a total weight of the monomer mixture, the plasticizer and the lithium salt. The plasticizer and lithium salt may each be mixed in an amount of 35-55%, preferably 35%, by weight relative to a total weight of the monomer mixture, the plasticizer and the lithium salt.

The polymer film solution may be subsequently stirred at a temperature of approximately 40-60° C., preferably 55° C., for approximately 1-3 hours, preferably 1 hour. The polymer film solution may then be UV cured at a wavelength of approximately 320 nm for approximately 10-30 minutes, preferably 20 minutes, to form the polymer electrolyte membrane.

In Step 4, the battery is formed by disposing the polymer electrolyte membrane between an anode and a cathode. The cathode includes a cathode active material. The cathode active material is any suitable cathode active material that is compatible with the polymer electrolyte membrane. For example, the cathode active material may be a lithium transition metal oxide such as NMC or lithium cobalt oxide, lithium phosphate, lithium iron phosphate or a mixture thereof. The cathode active material may be formed of particles having a diameter of approximately 15 nm to 5 μm.

The cathode may also include a binder and/or an electrically conductive additive. The binder may be any suitable electrode binder material. For example, the binder may include polyvinylidene fluoride, polytetrafluoroethylene, styrene-butadiene rubber, a cellulose material or any combination thereof. The electrically conductive additive may be any suitable sacrificial electrode additive, such as a material that acts as an additional source of lithium ions. For example, the electrically conductive additive can be a carbon material. The cathode has a thickness of approximately 50 μm to 150 μm, preferably 100 μm.

The cathode includes at least 80 percent by weight of the cathode active material, preferably at least 90 percent by weight of the cathode active material. The cathode also includes up to five percent by weight of the additive plus the binder. For example, the cathode may include approximately two percent by weight of the additive and approximately three percent by weight of the binder. The weight percentage values described above are relative to a total weight of the cathode.

The anode is formed of an anode active material. The anode may also optionally include a binder and an additive. The binder and additive may be the same binder and additive used for the cathode. The anode active material is lithium or a lithium alloy. The anode is preferably formed entirely of lithium metal. The anode includes approximately 90-95 percent by weight of the anode active material and five to ten percent by weight of any additive plus any binder. The anode has a thickness of approximately 10 nm to 3 μm.

In Step 6, deep discharging is performed to prelithiate the polymer electrolyte membrane. The deep discharging is performed by discharging the battery in a voltage range of −0.5 V to 5.0 V to strip lithium ions from the anode and store them in the polymer electrolyte membrane. For example, the battery may be discharged from a starting voltage of approximately 2.5 V to 5.0 V down to a final voltage of approximately 0.01 V to −0.5 V. This process may be performed several times, preferably four to five times, until the polymer electrolyte membrane is saturated with lithium ions. By increasing the amount of lithium ions stored in the polymer electrolyte membrane, the energy density of the battery can be improved to about 400-500 Wh/kg.

Figure 2:
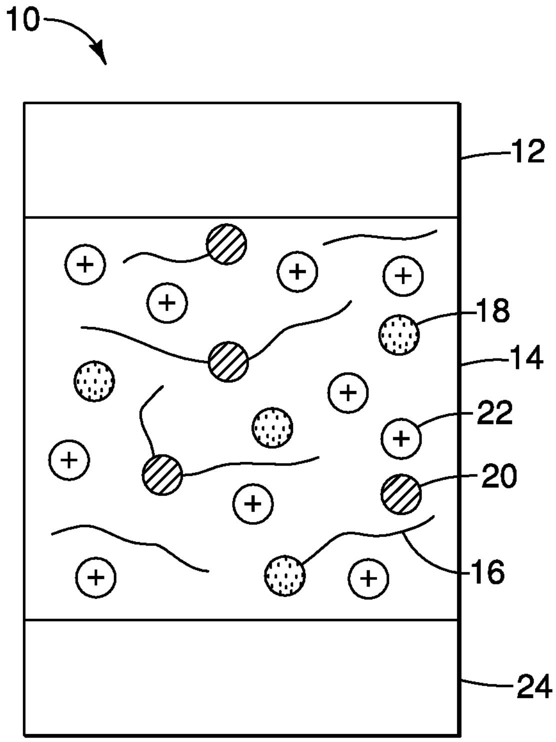
FIG. 2 is a cross sectional view of a supercapacitive battery according to a second embodiment.

FIG. 2 shows a supercapacitive battery 10 in accordance with a second embodiment. The supercapacitive battery 10 is a solid-state battery. The supercapacitive battery 10 can be incorporated in a vehicle, a mobile device, a laptop computer or other suitable personal electronic device. The supercapacitive battery 10 includes a cathode 12, a polymer electrolyte membrane 14 and an anode 24.

The cathode 12 includes a cathode active material. The cathode active material is any suitable cathode active material that is compatible with the polymer electrolyte membrane. For example, the cathode active material may be a lithium transition metal oxide such as NMC or lithium cobalt oxide, lithium phosphate, lithium iron phosphate or a mixture thereof. The cathode active material is formed of particles having a diameter of approximately 15 nm to 5 μm.

The cathode 12 may also include a binder and/or an electrically conductive additive. The binder may be any suitable electrode binder material. For example, the binder may include polyvinylidene fluoride, polytetrafluoroethylene, styrene-butadiene rubber, a cellulose material or any combination thereof. The electrically conductive additive may be any suitable sacrificial electrode additive, such as a material that acts as an additional source of lithium ions. For example, the electrically conductive additive can be a carbon material. The cathode 12 has a thickness of approximately 50 μm to 150 μm, preferably 100 μm.

The cathode 12 includes at least 80 percent by weight of the cathode active material, preferably at least 90 percent by weight of the cathode active material. The cathode also includes up to five percent by weight of the additive plus the binder. For example, the cathode 12 may include approximately two percent by weight of the additive and approximately three percent by weight of the binder. The weight percentage values described above are relative to a total weight of the cathode 12.

The polymer electrolyte membrane 14 includes a copolymer network 16 of a polyoxide and a polysulfide. The polyoxide can be any suitable polyoxide having the following formula:

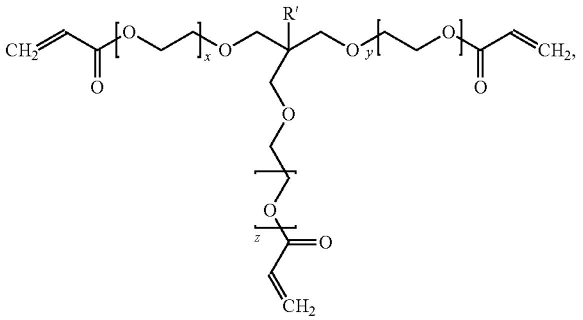

where R' is selected from the group consisting of: $CH_3$—; $CH_3$—$CH_2$—; $CH_3$—$CH_2$—$CH_2$—; $CH_3$—$CH_2$—$CH_2$—$CH_2$—; $CH_3$—$CH_2$—$CH_2$—$CH_2$—$CH_2$—; $CH_3$—$CH_2$—$CH_2$—$CH_2$—$CH_2$—$CH_2$—; $CH_3$—$CH_2$—$CH_2$—$CH_2$—$CH_2$—$CH_2$—$CH_2$—$CH_2$—; an isopropyl group; an isobutyl group; an isopentyl group; a sec-butyl group; a tert-butyl group; a tert-pentyl group; a tert-hexyl group; a phenyl group; a benzyl group; and an acrylic acid 2-(2-acryloyloxy-ethoxymethyl)-2-acryloyloxymethyl-butyl ester group, and x, y and z are integer numbers, the sum of which (x+y+z) ranges from 15 to 20, covering various combinations of EO-TMPTA (x+y+z=15) and PEG3A (x+y+z=20). The polyoxide is preferably formed from an EO-TMPTA prepolymer in which (x+y+z=15).

The polysulfide can be any suitable thiol-terminated polysulfide. For example, the polysulfide may be a star-branched polysulfide having the following formula:

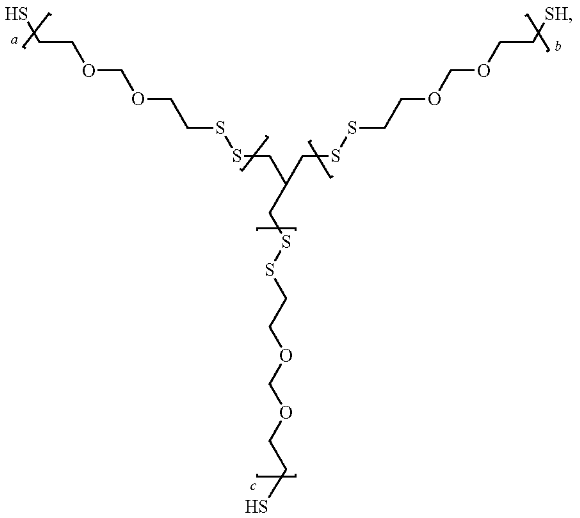

where a, b and c are integer numbers, the sum of which (a+b+c) ranges from 3 to 28, preferably 5 to 26. The flexibility of the polymer electrolyte membrane can be adjusted by changing the length of the polymer chain. For example, the longer the chain, the more the flexibility of the polymer electrolyte membrane will be increased. For example, the polysulfide can be a Thioplast® G prepolymer, preferably Thioplast® G1 or Thioplast® G4.

Alternatively, the polysulfide may be selected from the group consisting of: pentaerythritol tetrakis(3-mercaptopropionate), 2 2'-(ethylenedioxy) diethanethiol, hexa(ethylene glycol) dithiol, trimethylolpropane tris(3-mercaptopropionate), tris 2-(3-mercaptopropionyloxy)ethyl isocyanurate, and mixtures thereof.

The polymer electrolyte membrane 14 also includes a plasticizer 18 and a lithium salt 20. The plasticizer 18 may be any suitable plasticizer. For example, the plasticizer 18 can be SCN, VC, VIM, tetramethyl succinonitrile, or a mixture thereof. The plasticizer 18 is preferably SCN. Alternatively, the plasticizer 18 can be dimethyl phthalate, diethyl phthalate, diisobutyl phthalate, di-n-butyl phthalate, butyl benzyl phthalate, bis(2-ethylhexyl) phthalate, diisononyl phthalate, bis(2-propylheptyl) phthalate, diisodecyl phthalate, diisoundecyl phthalate, ditridecyl phthalate, bis(2-ethylhexyl)terephthalate, a trimellitate such as tri-(2-ethylhexyl)trimellitate, tri-(isononyl)trimellitate, tri-(isodecyl) trimellitate, or tri-(isotridecyl)trimellitate, tricresyl phosphate, 2-ethylhexyldiphenyl phosphate, tri-2-ethylhexyl phosphate, triethylene glycol di-2ethylhexanoate, or a mixture thereof.

The lithium salt 20 may be any suitable lithium salt. For example, the lithium salt 20 can be LiTFSI, LiFSI, LiFTFSI, $LiPF_6$, $LiBF_4$, $LiAsF_6$, $LiClO_4^-$, $LiCF_3SO_3$. triflate Tf, or a mixture thereof. The lithium salt 20 is preferably LiTFSI.

The polymer electrolyte membrane 14 includes approximately 15-30%, preferably 30%, by weight of the copolymer network 16 relative to a total weight of the polymer electrolyte membrane 14. In particular, the polymer electrolyte membrane 14 includes approximately 10-15% by weight of the polyoxide and approximately 5-10% by weight of the polysulfide. The polymer electrolyte membrane 14 also includes approximately 35-55%, preferably 35%, by weight of the plasticizer 18 and approximately 35-55%, preferably 35%, by weight of the lithium salt 20, relative to a total weight of the polymer electrolyte membrane 14.

The polymer electrolyte membrane 14 is prelithiated and therefore also contains excess lithium ions 22. The polymer electrolyte membrane 14 is prelithiated by deep discharging the battery 10 in a voltage range of −0.5 V to 5.0 V to strip lithium ions 22 from the anode 24 and store them in the polymer electrolyte membrane 14. For example, the battery 10 may be discharged from a starting voltage of approximately 2.5 V to 5.0 V down to a final voltage of approximately 0.01 V to −0.5 V. This process may be performed several times, preferably four to five times, until the polymer electrolyte membrane 14 is saturated with lithium ions. By increasing the amount of lithium ions 22 stored in the polymer electrolyte membrane 14, the energy density of the battery 10 can be significantly improved to about 400-500 Wh/kg.

The anode 24 is formed of an anode active material. The anode 24 may also optionally include a binder and an additive. The anode active material is lithium or a lithium alloy. The anode active material is preferably formed entirely of lithium metal.

The binder and additive may be any suitable binder and additive for a lithium-based anode. For example, the binder and additive may be the same binder and additive used for the cathode 12. The anode 24 includes approximately 90-95 percent by weight of the anode active material and five to ten percent by weight of any additive plus any binder. The 24 anode has a thickness of approximately 10 nm to 3 μm.

Figure 3:
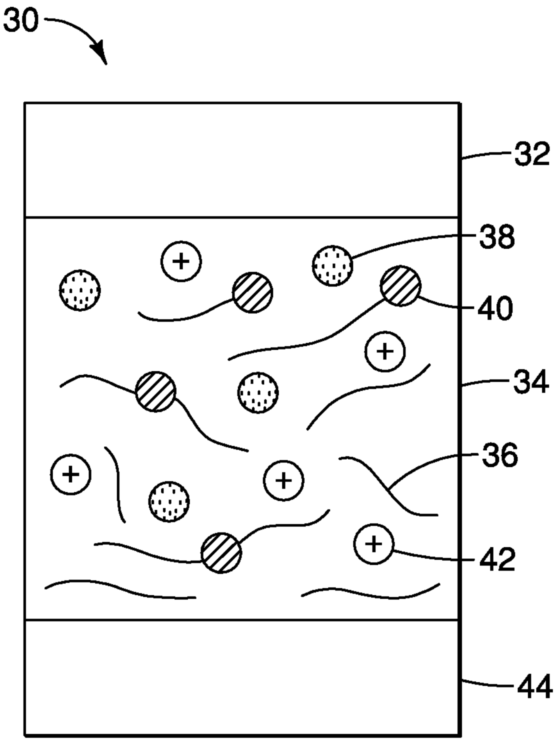
FIG. 3 is a cross sectional view of a supercapacitor according to a third embodiment.

FIG. 3 shows a supercapacitor 30 in accordance with a third embodiment. The supercapacitor 30 can be incorporated in a vehicle, a mobile device, a laptop computer or other suitable personal electronic device. The supercapacitor 30 includes a first electrode 32, a polymer electrolyte membrane 34 and a second electrode 44.

The first electrode 32 includes a carbon material. The carbon material is preferably an activated carbon material or a graphene material. For example, the carbon material is carbon black having a surface area of approximately 60 $m^2/g$ to 200 $m^2/g$, porous activated carbon having a surface area of approximately 600 $m^2/g$ to 1500 $m^2/g$, graphene having a surface area of approximately 1700 $m^2/g$ to 2000 $m^2/g$, carbon nanotube(s) having a surface area of approximately 300 $m^2/g$ to 1000 $m^2/g$, or a mixture thereof. The first electrode 32 has a thickness of approximately 35 μm to 150 μm.

The polymer electrolyte membrane 34 includes a copolymer network 36 of a polyoxide and a polysulfide. The polyoxide can be any suitable polyoxide having the following formula:

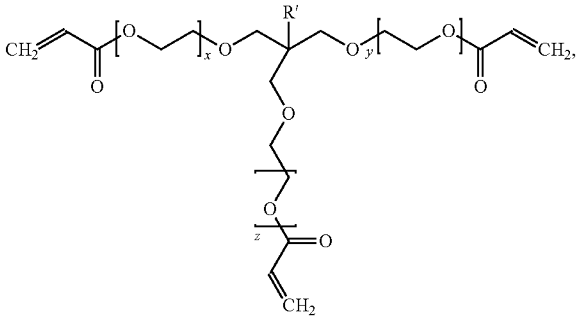

where R' is selected from the group consisting of: $CH_3$—; $CH_3$—$CH_2$—; $CH_3$—$CH_2$—$CH_2$—; $CH_3$—$CH_2$—$CH_2$—$CH_2$—; $CH_3$—$CH_2$—$CH_2$—$CH_2$—$CH_2$—; $CH_3$—$CH_2$—$CH_2$—$CH_2$—$CH_2$—$CH_2$—; $CH_3$—$CH_2$—$CH_2$—$CH_2$—$CH_2$—$CH_2$—$CH_2$—$CH_2$—; an isopropyl group; an isobutyl group; an isopentyl group; a sec-butyl group; a tert-butyl group; a tert-pentyl group; a tert-hexyl group; a phenyl group; a benzyl group; and an acrylic acid 2-(2-acryloyloxy-ethoxymethyl)-2-acryloyloxymethyl-butyl ester group, and x, y and z are integer numbers, the sum of which (x+y+z) ranges from 15 to 20, covering various combinations of EO-TMPTA (x+y+z=15) and PEG3A (x+y+z=20). The polyoxide is preferably formed from an EO-TMPTA pre-polymer in which (x+y+z=15).

The polysulfide can be any suitable thiol-terminated polysulfide. For example, the polysulfide may be a star-branched polysulfide having the following formula:

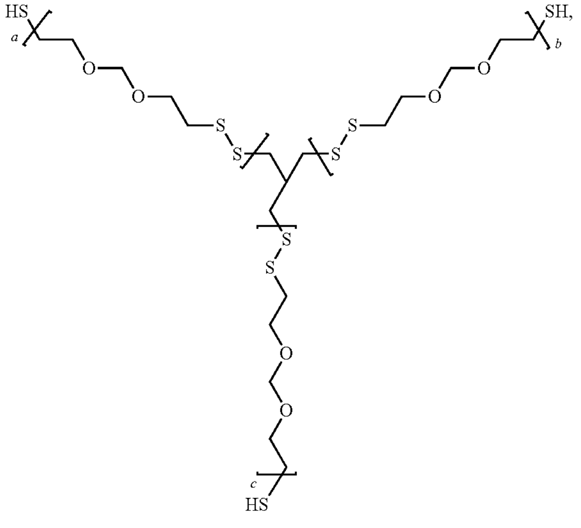

where a, b and c are integer numbers, the sum of which (a+b+c) ranges from 3 to 28, preferably 5 to 26. The flexibility of the polymer electrolyte membrane can be adjusted by changing the length of the polymer chain. For example, the longer the chain, the more the flexibility of the polymer electrolyte membrane will be increased. For example, the polysulfide can be a Thioplast® G prepolymer, preferably Thioplast® G1 or Thioplast® G4.

Alternatively, the polysulfide may be selected from the group consisting of: pentaerythritol tetrakis(3-mercaptopropionate), 2 2'-(ethylenedioxy) diethanethiol, hexa(ethylene glycol) dithiol, trimethylolpropane tris(3-mercaptopropionate), tris 2-(3-mercaptopropionyloxy)ethyl isocyanurate, and mixtures thereof.

The polymer electrolyte membrane 34 also includes a plasticizer 38 and a lithium salt 40. The plasticizer 38 may be any suitable plasticizer. For example, the plasticizer 38 can be SCN, VC, VIM, tetramethyl succinonitrile, or a mixture thereof. The plasticizer 38 is preferably SCN. Alternatively, the plasticizer 38 can be dimethyl phthalate, diethyl phthalate, diisobutyl phthalate, di-n-butyl phthalate, butyl benzyl phthalate, bis(2-ethylhexyl) phthalate, diisononyl phthalate, bis(2-propylheptyl) phthalate, diisodecyl phthalate, diisoundecyl phthalate, ditridecyl phthalate, bis(2-ethylhexyl)terephthalate, a trimellitate such as tri-(2-ethylhexyl)trimellitate, tri-(isononyl)trimellitate, tri-(isodecyl) trimellitate, or tri-(isotridecyl)trimellitate, tricresyl phosphate, 2-ethylhexyldiphenyl phosphate, tri-2-ethylhexyl phosphate, triethylene glycol di-2ethylhexanoate, or a mixture thereof.

The lithium salt 40 may be any suitable lithium salt. For example, the lithium salt 40 can be LiTFSI, LiFSI, LiFTFSI, $LiPF_6$, $LiBF_4$, $LiAsF_6$, $LiClO_4^-$, $LiCF_3SO_3$, triflate Tf, or a mixtures thereof. The lithium salt 40 is preferably LiTFSI.

The polymer electrolyte membrane 34 includes approximately 15-30%, preferably 30%, by weight of the copolymer network 36 relative to a total weight of the polymer electrolyte membrane 34. In particular, the polymer electrolyte membrane 34 includes approximately 10-15% by weight of the polyoxide and approximately 5-10% by weight of the polysulfide. The polymer electrolyte membrane 34 also includes approximately 35-55%, preferably 35%, by weight of the plasticizer 38 and approximately 35-55%, preferably 35%, by weight of the lithium salt 40, relative to a total weight of the polymer electrolyte membrane 34.

The polymer electrolyte membrane 34 is prelithiated and therefore also contains excess lithium ions 42. The polymer electrolyte membrane 34 is prelithiated by deep discharging the supercapacitor 30 in a voltage range of −0.5 V to 5.0 V to strip lithium ions 42 from the anode 44 and store them in the polymer electrolyte membrane 34. For example, the supercapacitor 30 may be discharged from a starting voltage of approximately 2.5 V to 5.0 V down to a final voltage of approximately 0.01 V to −0.5 V. This process may be performed several times, preferably four to five times, until the polymer electrolyte membrane 34 is saturated with lithium ions. By increasing the amount of lithium ions 42 stored in the polymer electrolyte membrane 34, the energy density of the supercapacitor 30 can be significantly improved to about 400-500 Wh/kg.

The second electrode 44 is formed of a carbon material. The carbon material is preferably an activated carbon material or a graphene material. For example, the carbon material is carbon black having a surface area of approximately 60 $m^2/g$ to 200 $m^2/g$, porous activated carbon having a surface area of approximately 600 $m^2/g$ to 1500 $m^2/g$, graphene having a surface area of approximately 1700 $m^2/g$ to 2000 $m^2/g$, carbon nanotube(s) having a surface area of approximately 300 $m^2/g$ to 1000 $m^2/g$, or a mixture thereof. The second electrode 44 has a thickness of approximately 35 μm to 150 μm.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A method of forming a battery having a prelithiated polymer electrolyte membrane, the method comprising:

forming a polymer electrolyte membrane comprising a copolymer network including a polyoxide and a polysulfide;

forming a battery including an anode, a cathode and the polymer electrolyte membrane disposed between the anode and the cathode; and performing deep discharging of the battery in a voltage range of −0.5 V to 5.0 V to prelithiate the polymer electrolyte membrane, where the performing deep discharging includes the battery being discharged from a starting voltage of approximately 2.5 V to 5.0 V down to a final voltage of approximately 0.01 V to −0.5 V;

at least one of the anode and the cathode comprising a material that includes lithium.

2. The method according to claim 1, wherein the polyoxide is poly(ethoxylated trimethylolpropane triacrylate) and the polysulfide is a thiol-terminated star-branched polysulfide.

3. The method according to claim 1, wherein the polymer electrolyte membrane further comprises a plasticizer and a lithium salt.

4. The method according to claim 3, wherein the plasticizer includes at least one of succinonitrile, ethylene carbonate and vinylene carbonate.

5. The method according to claim 3, wherein the lithium salt includes at least one of lithium bis (trifluoromethane sulfonyl) imide and lithium hexafluorophosphate.

6. The method according to claim 1, wherein the anode is formed of lithium metal.

7. The method according to claim 1, wherein the cathode includes a lithium transition metal oxide.

8. The method according to claim 1, wherein the deep discharging of the battery includes stripping lithium ions from the anode to store them in the cathode and the polymer electrolyte membrane.

9. The method according to claim 3, wherein the polymer electrolyte membrane includes approximately 15 to 30% by weight of the copolymer network, approximately 35 to 55% by weight of the plasticizer, and approximately 35 to 55% by weight of the lithium salt.

10. The method according to claim 1, wherein the cathode has a thickness of approximately 50 μm to 150 μm and the anode has a thickness of approximately 10 nm to 3 μm.

11. The method according to claim 1, the polyoxide having the following formula:

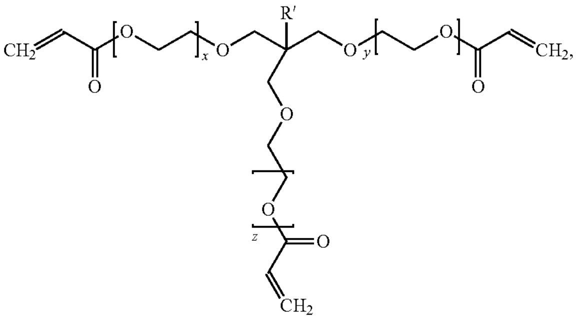

where R' is selected from the group consisting of: $CH_3$—; $CH_3$—$CH_2$—; $CH_3$—$CH_2$—$CH_2$—; $CH_3$—$CH_2$—$CH_2$—$CH_2$—; $CH_3$—$CH_2$—$CH_2$—$CH_2$—$CH_2$—; $CH_3$—$CH_2$—$CH_2$—$CH_2$—$CH_2$—$CH_2$—; $CH_3$—$CH_2$—$CH_2$—$CH_2$—$CH_2$—$CH_2$—$CH_2$—$CH_2$—; an isopropyl group; an isobutyl group; an isopentyl group; a sec-butyl group; a tert-butyl group; a tert-pentyl group; a tert-hexyl group; a phenyl group; a benzyl group; and an acrylic acid 2-(2-acryloyloxy-ethoxymethyl)-2-acryloyloxymethyl-butyl ester group, and x, y and z are integer numbers, the sum of which (x+y+z) ranges from 15 to 20, and the polysulfide having the following formula:

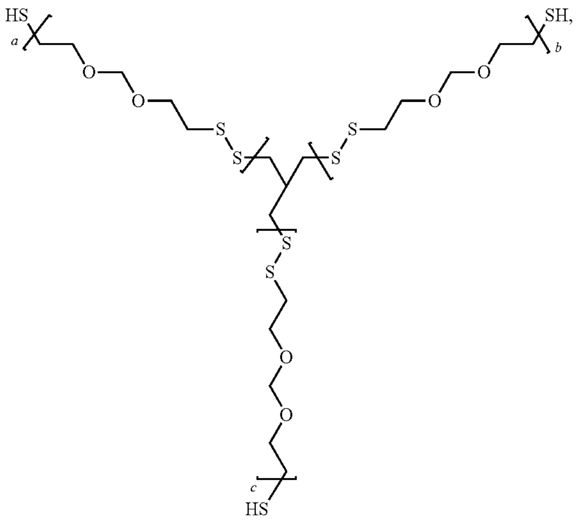

where a, b and c are integer numbers, the sum of which (a+b+c) ranges from 3 to 28.

12. The method according to claim 1, wherein the performing deep discharging includes repeating four times.

13. The method according to claim 1, wherein the performing deep discharging includes repeating five times.

14. The method according to claim 1, wherein the performing deep discharging includes repeating from four times to five times.

15. The method according to claim 1, wherein the performing deep discharging includes repeating until the polymer electrolyte membrane is saturated with lithium ions.

16. The method according to claim 1, wherein an energy density of the battery is improved to about from 400 to 500 Wh/kg based on the performing deep discharging.

17. The method according to claim 1, wherein the polysulfide is selected from the group consisting of pentaerythritol tetrakis(3-mercaptopropionate), 2-2'-(ethylenedioxy) diethanethiol, hexa (ethylene glycol) dithiol, trimethylolpropane tris(3-mercaptopropionate), tris 2-(3-mercaptopropionyloxy) ethyl isocyanurate, and mixtures thereof.

* * * * *